United States Patent [19]
Iida et al.

[11] Patent Number: 5,420,416
[45] Date of Patent: May 30, 1995

[54] LIGHT WAVELENGTH SELECTION DEVICE AND METHOD USING DIFFRACTION GRATING WITH PEAK DETECTION

[75] Inventors: Masanori Iida; Hiroyuki Asakura; Tetuji Miwa, all of Osaka, Japan

[73] Assignee: Matsushita Electric Industrial Co., Ltd., Japan

[21] Appl. No.: 160,212

[22] Filed: Dec. 2, 1993

[30] Foreign Application Priority Data

Jan. 14, 1993 [JP] Japan ................................. 5-004834

[51] Int. Cl.⁶ .............................................. G01J 1/20
[52] U.S. Cl. ............................. 250/201.1; 250/227.23
[58] Field of Search ................ 250/227.18, 227.23, 250/201.1, 226, 227; 356/328, 308, 326, 434

[56] References Cited

U.S. PATENT DOCUMENTS

| | | | |
|---|---|---|---|
| 4,815,820 | 3/1989 | McNeil et al. | 350/162.17 |
| 5,173,794 | 12/1992 | Cheung et al. | 359/127 |
| 5,233,405 | 8/1993 | Wildnauer et al. | 356/333 |
| 5,268,737 | 12/1993 | Fukuma et al. | 356/328 |

FOREIGN PATENT DOCUMENTS

| | | |
|---|---|---|
| 57-26720 | 2/1982 | Japan . |
| 62-115403 | 5/1987 | Japan . |
| 63-136721 | 6/1988 | Japan . |
| 2-116073 | 4/1990 | Japan . |

*Primary Examiner*—David C. Nelms
*Assistant Examiner*—Steven L. Nichols
*Attorney, Agent, or Firm*—Parkhurst, Wendel & Rossi

[57] ABSTRACT

An input light beam is applied to a diffraction element. The diffraction element is moved relative to a path of the input light beam while the input light beam is diffracted by the diffraction element and is thereby made into a diffracted light beam traveling from the diffraction element. A portion of the diffracted light beam is detected, and an intensity of the received diffracted light beam is also detected. In addition, a peak of the detected intensity of the received diffracted light beam is detected while the diffraction element is moved relative to the path of the input light beam. A position of the diffraction element is detected at which the detected peak of the detected intensity occurs. The position of the diffraction element is controlled on the basis of the detected position at which the detected peak of the detected intensity occurs.

27 Claims, 10 Drawing Sheets

LIGHT WAVELENGTH SELECTION DEVICE AND METHOD USING DIFFRACTION GRATING WITH PEAK DETECTION

BACKGROUND OF THE INVENTION

1. Field of the Invention

This invention relates to a light wavelength selection device for various optical systems such as a WDM (wavelength division multiplexing) optical communication system and a WDM optical CATV system. This invention also relates to a method related to such a light wavelength selection device.

2. Description of the Prior Art

WDM (wavelength division multiplexing) optical communication systems use a composite light beam having component light beams of different wavelengths respectively. Such optical communication systems are generally provided with light wavelength selection devices or optical demultiplexing circuits for separating a composite light beam into component light beams of different wavelengths respectively.

It is known to use a diffraction grating in a light wavelength selection device or an optical demultiplexing circuit. Generally, such a grating-based light wavelength selection device enables accurate tuning of light in a wide wavelength band.

In the grating-based light wavelength selection device, a composite light beam is applied to the diffraction grating, and is thus separated into component light beams of different wavelengths which travel along different directions from the diffraction grating respectively. Desired one of the component light beams is incident to an inlet of an optical fiber located at a given position relative to the diffraction grating. In this way, desired one of the component light beams is selected.

Regarding known grating-based light wavelength selection devices, it is generally difficult to easily adjust or change a selected wavelength (a tuned wavelength). The ability of easily changing the selected wavelength is effective and advantageous in making the devices usable in various systems.

Japanese published unexamined patent application 62-115403 discloses an optical tuner including a diffraction grating, a lens, an input optical fiber, an output optical fiber, a rotating mechanism, and a photodetector. In the optical tuner of Japanese application 62-115403, a composite input light beam having component light beams of different wavelengths is applied to the diffraction grating from the input optical fiber via the lens, and is thus separated into the component light beams of the different wavelengths respectively. The component light beams travel along different directions from the diffraction grating respectively, and then enter the lens so that they are focused on different points respectively. An inlet of the output optical fiber is located at one of the points of the focuses. Thus, one of the component light beams is incident to the output optical fiber. In this way, one of the component light beams is selected. The selected component light beam is guided via the output optical fiber to the photodetector. In the optical tuner of Japanese application 62-115403, the rotating mechanism serves to rotate the diffraction grating. This mechanism is activated to rotate the diffraction grating when the reception of another component light beam is required.

U.S. Pat. No. 4,815,820 discloses a method and an improved apparatus for aligning a diffraction grating, as, for example, one used in tuning the output of a laser. The total angular misalignment "$\epsilon$" between the incident and diffracted beams is a function of three angles: the tuning angle "$\theta$", the angle of tilt "$\beta$" between the plane of the grating and the tuning rotational axis, and the angle "$\alpha$" between the grating lines and the projection of the tuning rotational axis In the plane of the grating. In the method and apparatus of U.S. Pat. No. 4,815,820, by adjusting only or only "$\beta$" to zero at two reference tuning angles "$\theta_0$" and "$\theta_1$", the residual alignment error Is made very small over the desired range of tuning angle "$\theta$".

SUMMARY OF THE INVENTION

It is an object of this invention to provide an improved light wavelength selection device.

It is another object of this invention to provide a method related to a light wavelength selection device.

A first aspect of this invention provides a method of starting a light wavelength selection device which comprises the steps of applying an input light beam to diffracting means; moving the diffracting means relative to a path of the input light beam while the input light beam is diffracted by the diffracting means and is thereby made into a diffracted light beam traveling from the diffracting means; receiving a portion of the diffracted light beam and detecting an intensity of the received diffracted light beam; detecting a peak of the detected intensity of the received diffracted light beam while the diffracting means is moved relative to the path of the input light beam; detecting a position of the diffracting means at which the detected peak of the detected intensity occurs; and controlling the position of the diffracting means on the basis of the detected position at which the detected peak of the detected intensity occurs.

A second aspect of this invention provides a method of stating a light wavelength selection device which comprises the steps of radiating an input light beam from a radiation position and applying the radiated input light beam to diffracting means; moving the radiation position relative to the diffracting means while the input light beam is diffracted by the diffracting means and is thereby made into a diffracted light beam traveling from the diffracting means; receiving a portion of the diffracted light beam and detecting an intensity of the received diffracted light beam; detecting a peak of the detected intensity of the received diffracted light beam while the radiation position is moved; detecting the radiation position at which the detected peak of the detected intensity occurs; and controlling the radiation position on the basis of the detected position at which the detected peak of the detected intensity occurs.

A third aspect of this invention provides a method of starting a light wavelength selection device which comprises the steps of applying an input light beam to diffracting means; receiving a portion of the diffracted light beam at a reception position and detecting an intensity of the received diffracted light beam; detecting a peak of the detected intensity of the received diffracted light beam while moving the reception position; detecting the reception position at which the detected peak of the detected intensity occurs; and controlling the reception position on the basis of the detected position at which the detected peak of the detected intensity occurs.

A fourth aspect of this invention provides a method of starting a light wavelength selection device which comprises the steps of previously memorizing relative distances between a reference position and positions of diffracting means for detecting light beams of different wavelengths respectively, the diffracting means having a reflecting portion; applying an input light beam to the diffracting means, the input light beam including a wavelength division multiplexed light beam having a plurality of component light beams of different wavelengths respectively; moving the diffracting means relative to a path of the input light beam while the input light beam is reflected by the reflecting portion and is thereby made into a reflected light beam traveling from the diffracting means; receiving the reflected light beam and detecting an intensity of the received reflected light beam; detecting a peak of the detected intensity of the received reflected light beam while the diffracting means is moved relative to the path of the input light beam; detecting a position of the diffracting means at which the detected peak of the detected intensity occurs; setting the detected position of the diffracting means at which the detected peak of the detected intensity occurs as the reference position; and controlling the position of the diffracting means on the basis of the reference position and the memorized relative distances.

A fifth aspect of this invention provides a light wavelength selection device comprising light inputting means for inputting an input light beam; light diffracting means for diffracting the input light beam; drive means for moving the diffracting means relative to a path of the input light beam; light receiving means for receiving a portion of a diffracted light beam which has been diffracted by the diffracting means; light intensity detecting means for detecting a peak of an intensity of the received diffracted light beam while the diffracting means is moved relative to the path of the input light beam by the drive means; position detecting means for detecting a position of the diffracting means at which the detected peak of the detected intensity occurs; memory means for storing the detected position of the diffracting means at which the detected peak of the detected intensity occurs; and controlling means for controlling the drive means on the basis of the stored position of the diffracting means.

A sixth aspect of this invention provides a light wavelength selection device comprising light inputting means for inputting an input light beam; drive means for moving the light inputting means; light diffracting means for diffracting the input light beam; light receiving means for receiving a portion of a diffracted light beam which has been diffracted by the diffracting means; light intensity detecting means for detecting a peak of an intensity of the received diffracted light beam while the light inputting means is moved by the drive means; position detecting means for detecting a position of the light inputting means at which the detected peak of the detected intensity occurs; memory means for storing the detected position of the light inputting means at which the detected peak of the detected intensity occurs; and controlling means for controlling the drive means on the basis of the stored position of the light inputting means.

A seventh aspect of this invention provides a light wavelength selection device comprising light inputting means for inputting an input light beam; light diffracting means for diffracting the input light beam; light receiving means for receiving a portion of a diffracted light beam which has been diffracted by the diffracting means; drive means for moving the light receiving means; light intensity detecting means for detecting a peak of an intensity of the received diffracted light beam while the light receiving means is moved by the drive means; position detecting means for detecting a position of the light receiving means at which the detected peak of the detected intensity occurs; memory means for storing the detected position of the light receiving means at which the detected peak of the detected intensity occurs; and controlling means for controlling the drive means on the basis of the stored position of the light receiving means.

An eighth aspect of this invention provides a light wavelength selection device comprising memory means for previously storing relative distances between a reference position and positions for detecting light beams of different wavelengths respectively; light inputting means for inputting an input light beam which includes a wavelength division multiplexed light beam having a plurality of component light beams of different wavelengths respectively; light diffracting means for diffracting the input light beam, the light diffracting means having a reflecting portion; drive means for moving the diffracting me,ms relative to a path of the input light beam; light receiving means for receiving a portion of a diffracted light beam which has been diffracted by the diffracting means; light intensity detecting means for detecting a peak of an intensity of a reflected light beam which has been reflected by the reflecting portion of the diffracting means while the diffracting means is moved relative to the path of the input light beam by the drive means; position detecting means for detecting a position of the diffracting means at which the detected peak of the detected intensity occurs, and for setting the detected position of the diffracting means as the reference position; and controlling means for controlling the drive means on the basis of the reference position and the previously stored relative distances.

A ninth aspect of this invention provides a method comprising the steps of applying a reference light beam of a given wavelength to a diffraction element during a preliminary mode of operation, wherein the reference light beam is diffracted by the diffraction element and is thereby changed into a diffracted reference light beam traveling from the diffraction element; rotating the diffraction element relative to a direction of travel of the reference light beam while the reference light beam remains applied to the diffraction element during the preliminary mode of operation; detecting an intensity of a portion of the diffracted reference light beam in a given positional region fixed with respect to the direction of travel of the reference light beam; detecting a position of the diffraction element at which the detected intensity peaks while the diffraction element remains rotated during the preliminary mode of operation; setting the detected position of the diffraction element at which the detected intensity peaks as a reference position during the preliminary mode of operation; during a normal mode of operation which follows the preliminary mode of operation, applying a wavelength division multiplexed input light beam to the diffraction element along a direction equal to the direction of travel of the reference light beam, wherein the input light beam is diffracted by the diffraction element and is thereby changed into a diffracted input light beam traveling from the diffraction element; controlling and determining a current position of the diffraction element in response to the reference position during the normal mode of operation; and selecting a portion of the diffracted input light beam which travels in the given positional region.

A tenth aspect of this invention provides an apparatus comprising a rotatable diffraction element; means for applying a reference light beam of a given wavelength to the diffraction element during a preliminary mode of operation, wherein the reference light beam is diffracted by the diffraction element and is thereby changed into a diffracted reference light beam traveling from the diffraction element; means for rotating the diffraction element relative to a direction of travel of the reference light beam while the reference light beam remains applied to the diffraction element during the preliminary mode of operation; means for detecting an intensity of a portion of the diffracted reference light beam in a given positional region fixed with respect to the direction of travel of the reference light beam; means for detecting a position of the diffraction element at which the detected intensity peaks while the diffraction element remains rotated during the preliminary mode of operation; means for setting the detected position of the diffraction element at which the detected intensity peaks as a reference position during the preliminary mode of operation; means for, during a normal mode of operation which follows the preliminary mode of operation, applying a wavelength division multiplexed input light beam to the diffraction element along a direction equal to the direction of travel of the reference light beam, wherein the input light beam is diffracted by the diffraction element and is thereby changed into a diffracted input light beam traveling from the diffraction element; means for controlling and determining a current position of the diffraction element in response to the reference position during the normal mode of operation; and means for selecting a portion of the diffracted input light beam which travels in the given positional region.

DESCRIPTION OF THE FIRST PREFERRED EMBODIMENT

Figure 1:
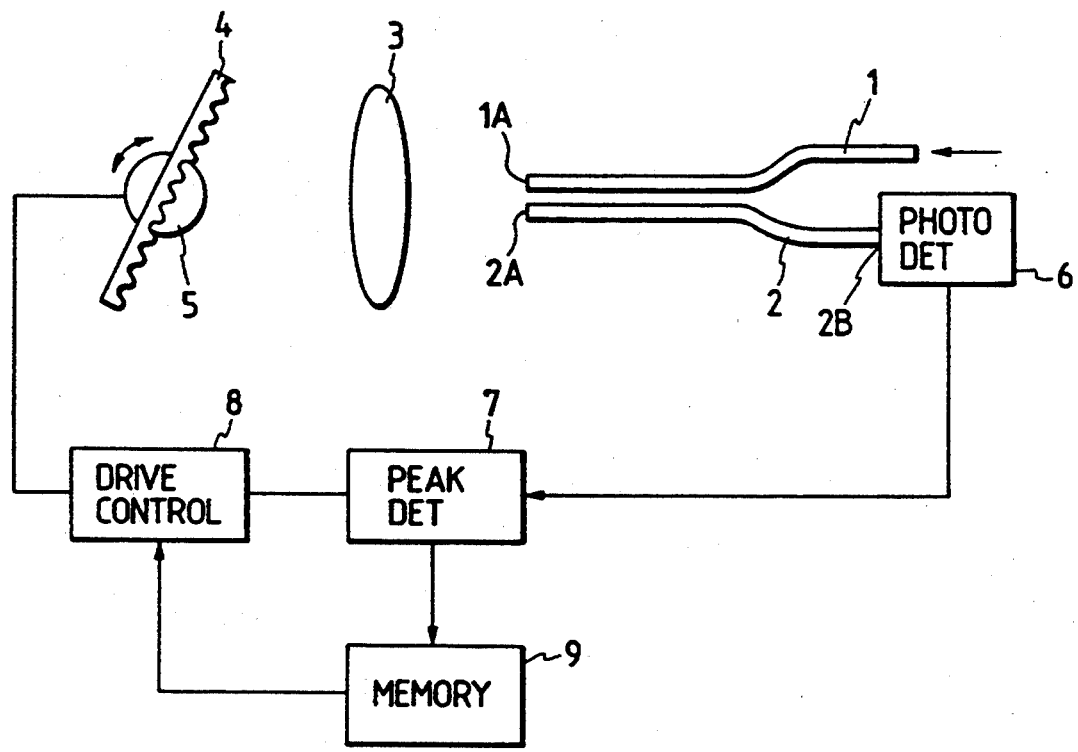
FIG. 1 is a diagram of a light wavelength selection device according to a first embodiment of this invention.

With reference to FIG. 1, a light wavelength selection device includes an Input optical fiber 1, an output optical fiber 2, a lens 3, a diffraction grating 4, a photodetector 6, a peak detector 7, a drive controller 8, and a memory device 9.

The input optical fiber 1 has an outlet 1A located near an inlet 2A of the output optical fiber 2. The lens 3 is disposed in an optical path between the diffraction grating 4 and the outlet 1A of the input optical fiber 1, and between an optical path between the diffraction grating 4 and the inlet 2A of the output optical fiber 2. The diffraction grating 4 may use a general diffraction grating or a Fourier diffraction grating (see Applied Optics, vol. 31, No. 16, 3015-3019, in 1992). The diffraction grating 4 is rotatable about a central axis parallel to the grating lines (the grating grooves) thereof. The diffraction grating 4 is connected to an electrically-driven actuator or a rotating mechanism 5. The diffraction grating 4 can be rotated by the rotating mechanism 5. The angular relation of the diffraction grating 4 with the outlet 1A of the input optical fiber 1, the inlet 2A of the output optical fiber 2, and the lens 3 varies in accordance with the rotation of the diffraction grating 4. The rotating mechanism 5 includes a combination of a stepping motor and reduction gears.

An outlet 2B of the output optical fiber 2 is coupled with the photodetector 6. The photodetector 6 is electrically connected to the peak detector 7. The peak detector 7 is electrically connected to the drive controller 8 and the memory device 9. The drive controller 8 is electrically connected to the rotating mechanism 5. The rotating mechanism 5 is driven by an output signal from the drive controller 8. As the rotating mechanism 5 is driven by the output signal from the drive controller 8, the diffraction grating 4 is rotated by the rotating mechanism 5.

Operation of the light wavelength selection device can be changed between a preliminary mode and a normal mode. The preliminary mode of operation is executed before the normal mode of operation.

During the preliminary mode of operation, a reference light beam having a predetermined wavelength (reference wavelength) $\lambda 0$ is introduced into the input optical fiber 1. The reference light beam is guided by the input optical fiber 1, and then exists from the input optical fiber 1 via the outlet 1A thereof. Then, the reference light beam travels to the lens 3 while spreading or diverging. The reference light beam is made by the lens 3 into a parallel light beam which reaches the diffraction grating 4. The reference light beam is diffracted by the diffraction grating 4, and then travels from the diffraction grating 4 in a direction which depends on the angular position of the diffraction grating 4 and the wavelength $\lambda 0$ of the reference light beam. Subsequently, the reference light beam basically enters the lens 3, and is focused by the lens 3 into a spot at a position which depends on the angular position of the diffraction grating 4 and the wavelength λ0 of the reference light beam.

During the preliminary mode of operation, the drive controller 8 controls the rotating mechanism 5 so that the diffraction grating 4 will continue to be gradually rotated in a given angular range by the rotating mechanism 5. The angular position of the diffraction grating 4 determines whether or not the position of the spot of the reference light beam coincides with the position of the inlet 2A of the output optical fiber 2, that is, whether or not the reference light beam enters the output optical fiber 2. When the reference light beam enters the output optical fiber 2, the reference light beam is guided by the output optical fiber 2 to the photodetector 6. In this way, the reference light beam which enters the output optical fiber 2 is received by the photodetector 6. The photodetector 6 converts the received reference light beam into an electric signal having a voltage representing the intensity of the received reference light beam. The photodetector 6 outputs the voltage signal to the peak detector 7.

The intensity of the reference light beam received by the photodetector 6 varies in accordance with the degree of the coincidence between the position of the spot of the reference light beam and the position of the inlet 2A of the output optical fiber 2. The degree of the coincidence between the position of the spot of the reference light beam and the position of the inlet 2A of the output optical fiber 2 depends on the angular position of the diffraction grating 4 and the wavelength λ0 of the reference light beam. Accordingly, the intensity of the reference light beam received by the photodetector 6 varies as a function of the angular position of the diffraction grating 4.

Figure 2:
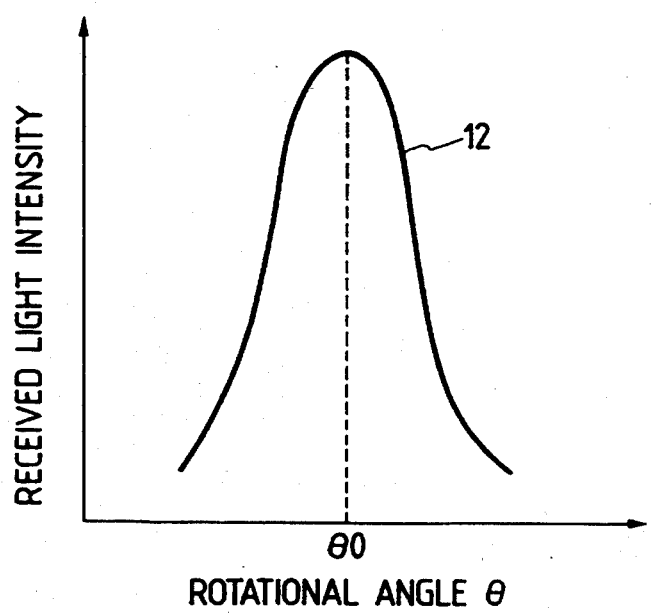
FIG. 2 is a diagram of the relation between the rotational angle of a diffraction grating and the intensity of a received light beam in the light wavelength selection device of FIG. 1.

Specifically, as shown in FIG. 2, the intensity of the reference light beam received by the photodetector 6 peaks at a given angular position θ0 of the diffraction grating 4. It should be noted that the given angular position θ0 of the diffraction grating 4 depends on the wavelength λ0 of the reference light beam.

Thus, during the preliminary mode of operation in which the diffraction grating 4 continues to be rotated, the voltage of the output signal from the photodetector 6 peaks when the angular position "θ" of the diffraction grating 4 reaches the given angular position θ0. The peak of the output signal from the photodetector 6 is detected by the peak detector 7. The peak detector 7 informs the drive controller 8 of the detection of the peak of the output signal from the photodetector 6. The drive controller 8 outputs a signal representative of the current angular position of the diffraction grating 4 (that is, the given angular position θ0 of the diffraction grating 4) to the memory device 9 in response to the information from the peak detector 7. At the same time, the peak detector 7 outputs a write enabling signal to the memory device 9 so that the angular position signal outputted from the drive controller 8 is stored into the memory device 9. In this way, the angular position signal which represents the given angular position θ0 of the diffraction grating 4 is stored into the memory device 9. The given angular position θ0 is a reference angular position of the diffraction grating 4 which corresponds to the reference wavelength λ0, that is, the wavelength of the reference light beam. In addition, an externally-applied signal (not shown) representing the reference wavelength λ0 is stored into the memory device 9.

The preliminary mode of operation provides calibration of the light wavelength selection device. For example, an uncalibrated angular position "θ" of the diffraction grating 4 is given as "θ=α+f(λ)" where "α" denotes an offset angular constant and "f(λ)" denotes a predetermined function of the selected wavelength "λ". As previously described, the preliminary mode of operation detects the reference angular position θ0 of the diffraction grating 4 which corresponds to the reference wavelength λ0. The offset angular constant "α" can be determined on the basis of the reference wavelength λ0 and the reference angular position θ0 of the diffraction grating 4. The determination of the offset angular constant "α" means calibration of the angular position of the diffraction grating 4, that is, calibration of the light wavelength selection device.

The normal mode of operation is executed after the preliminary mode of operation. During the normal mode of operation, the drive controller 8 receives an externally-applied tuning control signal representing a desired wavelength λd to be selected. In addition, the drive controller 8 reads out the angular position signal from the memory device 9 which represents the reference angular position θ0. The drive controller 8 also reads out the wavelength signal from the memory device 9 which represents the reference wavelength λ0. The drive controller 8 calculates a desired angular position θd relative to the reference angular position θ0 on the basis of the desired wavelength λd and the reference wavelength λ0. The drive controller 8 controls the rotating mechanism 5 in response to the desired angular position θd so that the diffraction grating 4 will assume an angular position which agrees with the desired angular position θd. In this way, the diffraction grating 4 is set to the desired angular position θd at which the desired wavelength λd is selected. Then, the diffraction grating 4 continues to be fixed at the desired angular position θd.

During the normal mode of operation, the input optical fiber 1 guides a wavelength division multiplexed (WDM) light beam or a composite light beam which has a plurality of component light beams of different wavelengths respectively. The desired wavelength λd represented by the tuning control signal is set equal to designated one of the wavelengths of the component light beams. The WDM light beam exits from the input optical fiber 1 via the outlet 1A thereof, and then travels to the lens 3 while spreading or diverging. The WDM light beam is made by the lens 3 into a parallel light beam which reaches the diffraction grating 4. The parallel WDM light beam is separated by the diffraction grating 4 into the component light beams of the different wavelengths which travel along different directions from the diffraction grating 4 respectively. The directions of the travel of the component light beams from the diffraction grating 4 depend on the wavelengths of the component light beams.

Subsequently, the component light beams basically enter the lens 3, and are focused by the lens 3 into spots at different positions which depend on the wavelengths thereof. Only one of the component light beams which has a wavelength equal to the desired wavelength λd forms a spot positionally coincident with the inlet 2A of the output optical fiber 2. Accordingly, only the component light beam of the desired wavelength λd enters the output optical fiber 2 via the inlet 2A thereof. In this way, the component light beam of the desired wavelength λd is selected. The selected light beam is guided to the photodetector 6 via the output optical fiber 2 before being detected by the photodetector 6.

DESCRIPTION OF THE SECOND PREFERRED EMBODIMENT

Figure 3:
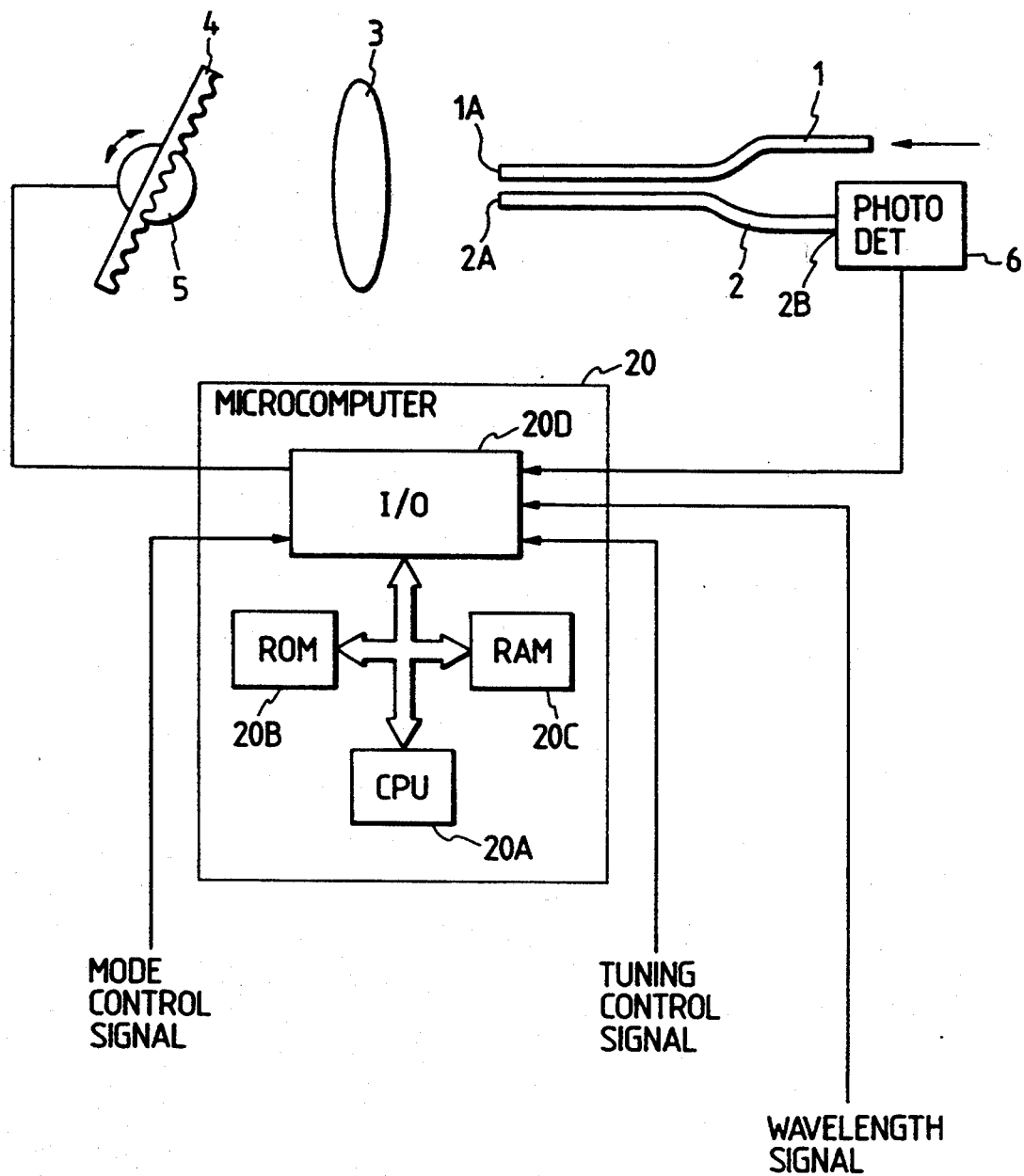
FIG. 3 is a diagram of a light wavelength selection device according to a second embodiment of this invention.

FIG. 3 shows a second embodiment of this invention which is similar to the embodiment of FIG. 1 except for design changes indicated hereinafter. The embodiment of FIG. 3 includes a microcomputer 20 electrically connected to a rotating mechanism 5 and a photodetector 6.

The microcomputer 20 has a combination of a CPU 20A, a ROM 20B, a RAM 20C, and an input/output (I/O) port 20D. The I/O port 20D is electrically connected to the rotating mechanism 5 and the photodetector 6. The I/O port 20D includes an A/D converter which converts an analog output signal of the photodetector 6 into a corresponding digital signal. The I/O port 20D also includes a D/A converter or an interface which converts angular position digital data into a corresponding signal suited to drive the rotating mechanism 5. The I/O port 20D is fed with a mode control signal, a tuning control signal, and a wavelength signal. The state of the mode control signal depends on whether a preliminary mode of operation or a normal mode of operation is required. The tuning control signal represents a wavelength to be selected, that is, a desired wavelength λd. The wavelength signal represents a reference wavelength λ0.

Figure 4:
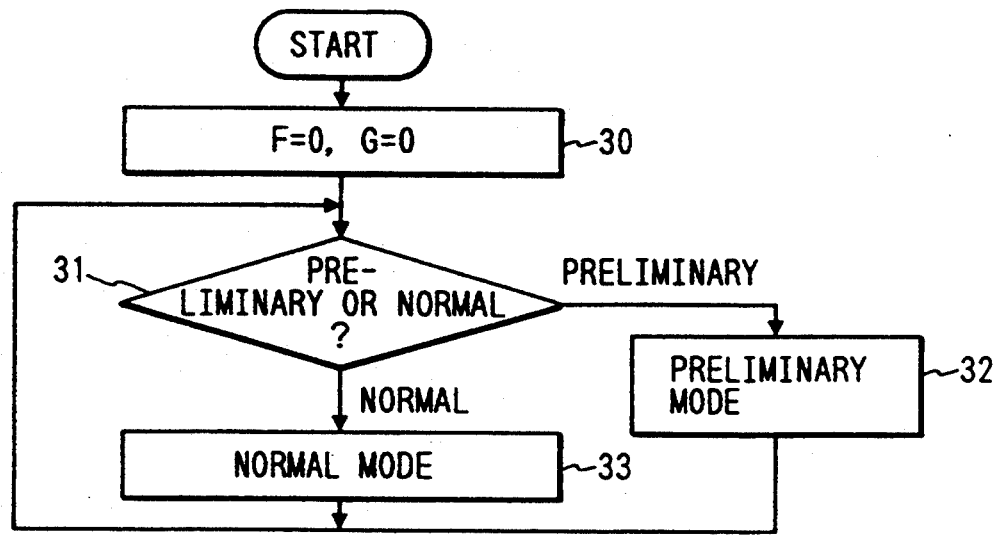
FIG. 4 is a flowchart of a program for controlling a microcomputer in the light wavelength selection device of FIG. 3.

The microcomputer 20 operates in accordance with a program stored in the ROM 20B. FIG. 4 is a flowchart of this program. As shown in FIG. 4, a first step 30 of the program sets flags F and G to "0". After the step 30, the program advances to a step 31. The step 31 checks the state of the mode control signal and determines whether the mode control signal requires the preliminary mode of operation or the normal mode of operation. When the mode control signal is determined to require the preliminary mode of operation, the program advances from the step 31 to a preliminary mode block 32. When the mode control signal is determined to require the normal mode of operation, the program advances from the step 31 to a normal mode block 33. After the blocks 32 and 33, the program returns to the step 31.

When the mode control signal requires the preliminary mode of operation, a reference light beam of a predetermined wavelength equal to the reference wavelength λ0 is introduced into an input optical fiber 1. In addition, the microcomputer 20 controls the rotating mechanism 5 so that a diffraction grating 4 will continue to be gradually rotated in a given angular range by the rotating mechanism 5. As in the embodiment of FIG. 1, the voltage of the output signal from the photodetector 6 varies as a function of the angular position of the diffraction grating 4.

Figure 5:
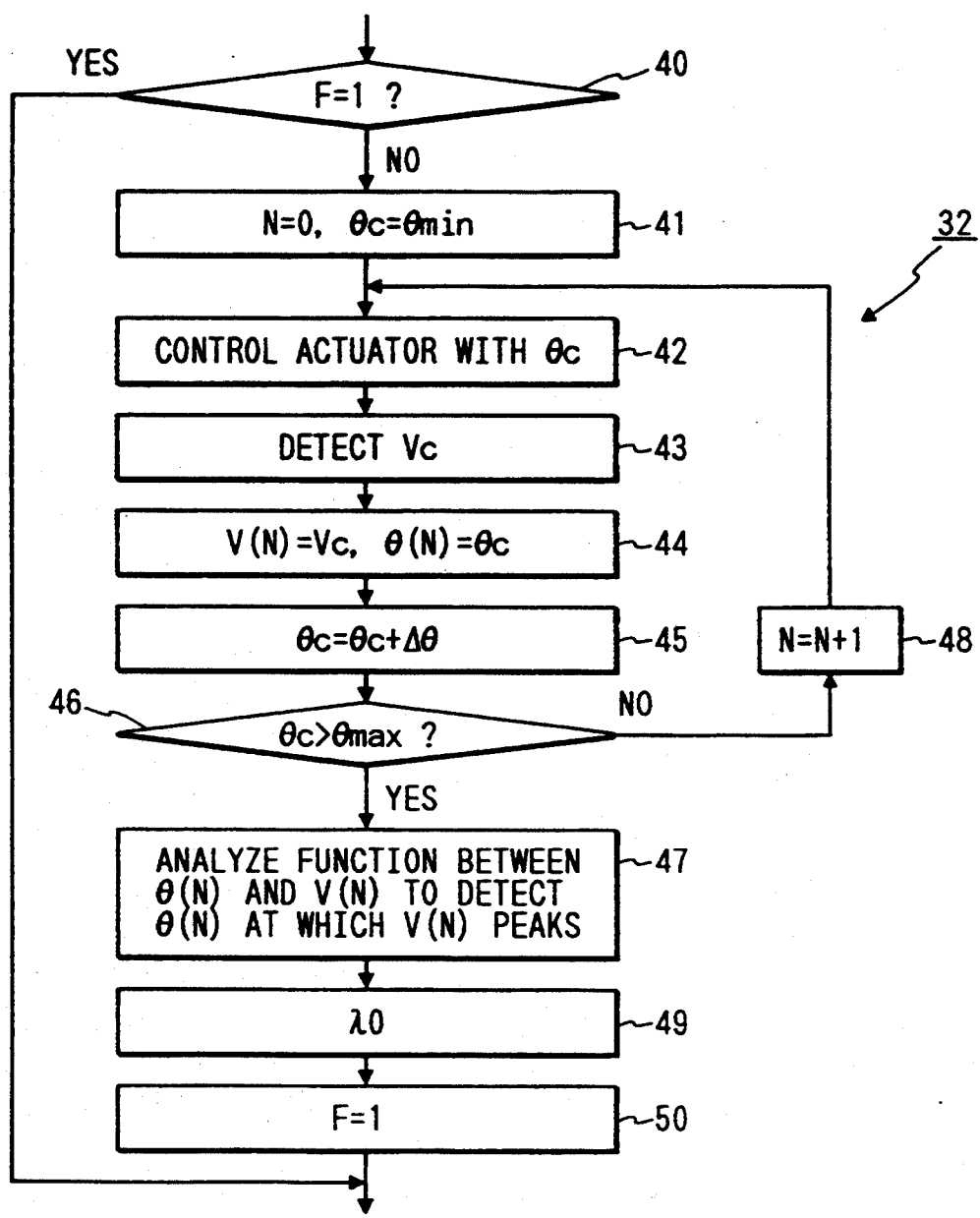
FIG. 5 is a diagram of the details of a preliminary mode block in FIG. 4.

FIG. 5 shows the details of the preliminary mode block 32. As shown in FIG. 5, a first step 40 in the preliminary mode block 32 which immediately follows the step 31 of FIG. 4 determines whether or not the flag F is "1". When the flag F is determined to be "1", the program advances from the step 40 and then exits from the preliminary mode block 32 before returning to the step 31 of FIG. 4. Otherwise, the program advances from the step 40 to a step 41.

The step 41 initializes variables N and θc. Specifically, the variable N is initialized to "0". In addition, the variable θc is initialized to a predetermined value θmin corresponding to a first predetermined angular position of a diffraction grating 4. The variable θc is used as an indication of the current angular position of the diffraction grating 4. After the step 41, the program advances to a step 42.

The step 42 controls the rotating mechanism (actuator) 5 in response to the value θc so that the diffraction grating 4 will be moved to an angular position corresponding to the value θc. A step 43 following the step 42 detects or derives the present value Vc of the voltage of the output signal from the photodetector 6. A step 44 following the step 43 sets values θ(N) and V(N) equal to the values θc and Vc respectively. Specifically, the step 44 stores a set of the present values θc and Vc into the RAM 20C as a set of the values θ(N) and V(N).

A step 45 following the step 44 increments the current angular position value θc by a predetermined small angular position value Δθ. A step 46 following the step 45 determines whether or not the current angular position value θc is greater than a predetermined value θmax corresponding to a second predetermined angular position of the diffraction grating 4. When the current angular position value θc is determined to be greater than the predetermined value θmax, the program advances from the step 46 to a step 47. Otherwise, the program advances from the step 46 to a step 48 which increments the value N by "1". After the step 48, the program returns to the step 42.

As a result, the sequence of the steps 42, 43, 44, 45, 46, and 48 is periodically reiterated until the current angular position value θc exceeds the predetermined value θmax. Thus, a set of the values θ(0) and V(0), a set of the values θ(1) and V(1), a set of the values θ(2) and V(2), ..., and a set of the values θ(Nmax) and V(Nmax) are stored in the RAM 20C where Nmax denotes the maximum of the value N. In other words, a set of the values θ(N) and V(N) or the function between the values θ(N) and V(N) are stored in the RAM 20C where N=1, 2, ..., Nmax.

The step 47 analyzes the relation or function between the values θ(N) and V(N), and detects the value θ(N) at which the value V(N) peaks. Specifically, the step 47 differentiates the value V(N) with respect to the value θ(N) to derive a peak of the value V(N), and then determines the value θ(N) at which the value V(N) peaks. The step 47 sets a value θ0 equal to the value θ(N) at which the value V(N) peaks. The value θ0 indicates a reference angular position equal to the given angular position of the diffraction grating 4 which corresponds to the reference wavelength λO. The step 47 stores data of the reference angular position θ0 into the RAM 20C. A step 49 following the step 47 derives the reference wavelength λ0 from the wavelength signal, and stores data of the reference wavelength λ0 into the RAM 20C. A step 50 following the step 49 sets the flag F to "1". After the step 50, the program exits from the preliminary mode block 32 and then returns to the step 31 of FIG. 4.

When the mode control signal requires the normal mode of operation, the input optical fiber 1 guides a wavelength division multiplexed (WDM) light beam or a composite light beam which has a plurality of component light beams of different wavelengths respectively. The desired wavelength λd represented by the tuning control signal is set equal to one of the wavelengths of the component light beams.

Figure 6:
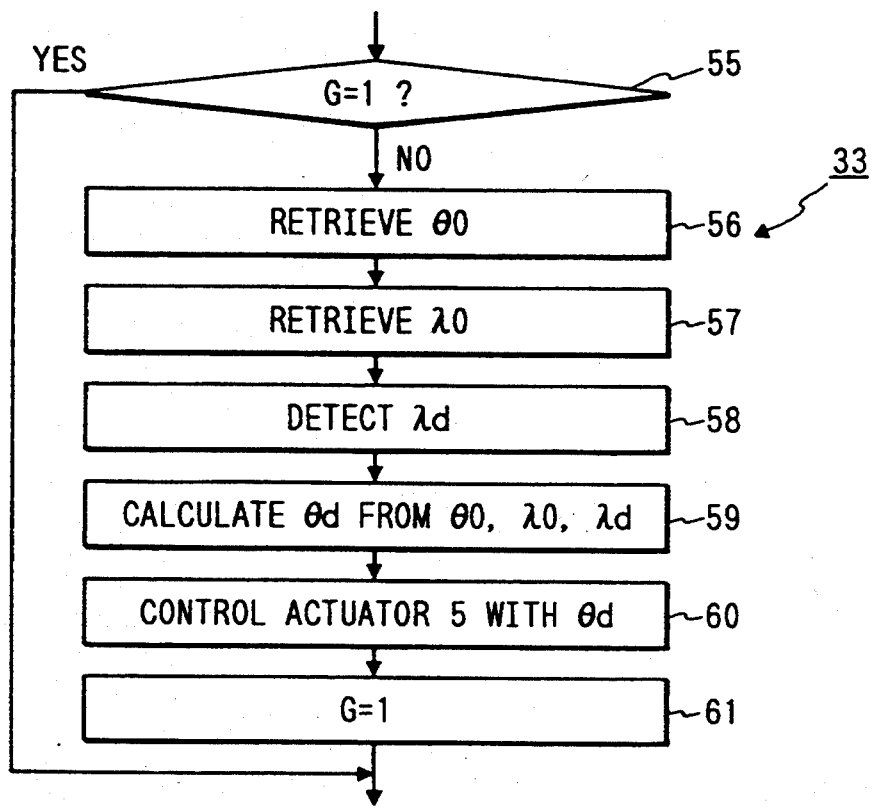
FIG. 6 is a diagram of the details of a normal mode block in FIG. 4.

FIG. 6 shows the details of the normal mode block 33. As shown in FIG. 6, a first step 55 in the normal mode block 33 which immediately follows the step 31 of FIG. 4 determines whether or not the flag G is "1". When the flag G is determined to be "1", the program advances from the step 55 and then exits from the normal mode block 33 before returning to the step 31 of FIG. 4. Otherwise, the program advances from the step 55 to a step 56.

The step 56 retrieves the data of the reference angular position $\theta 0$ from the RAM 20C. A step 57 following the step 56 retrieves the data of the reference wavelength $\lambda 0$ from the RAM 20C. A step 58 following the step 57 detects the desired wavelength $\lambda d$ represented by the tuning control signal. A step 59 following the step 58 calculates a desired angular position $\theta d$ of the diffraction grating 4 from the reference angular position $\theta O$, the reference wavelength $\lambda 0$, and the desired wavelength $\lambda d$ by referring to a predetermined function or a predetermined map.

A step 60 following the step 59 controls the rotating mechanism (actuator) 5 in response to the desired angular position $\theta d$ so that the diffraction grating 4 will be moved to an angular position corresponding to the desired angular position value $\theta d$. As in the embodiment of FIG. 1, only the component light beam of the desired wavelength $\lambda d$ is selected when the diffraction grating 4 is set to the desired angular position $\theta d$. A step 61 following the step 60 sets the flag G to "1". After the step 61, the program exits from the normal mode block 33 and then returns to the step 31 of FIG. 4.

DESCRIPTION OF THE THIRD PREFERRED EMBODIMENT

A third embodiment of this invention is similar to the embodiment of FIG. 1 except for design changes indicated hereinafter.

Figure 7:
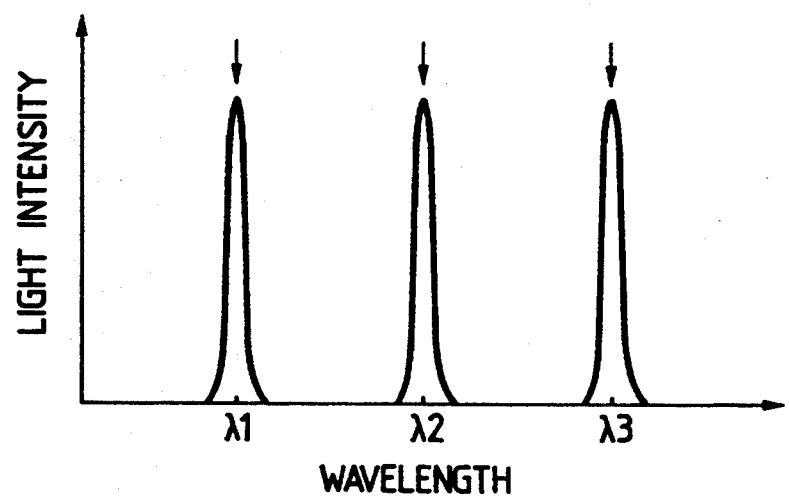
FIG. 7 is a diagram of the spectrum of a wavelength division multiplexed light beam.

During a preliminary mode of operation, a reference WDM (wavelength division multiplexed) light beam is introduced into an input optical fiber 1 (see FIG. 1). The reference WDM light beam is a reference composite light beam which has a plurality of component light beams of predetermined different wavelengths $\lambda 1$, $\lambda 2$, and $\lambda 3$ respectively. As shown in FIG. 7, the component light beams of the different wavelengths $\lambda 1$, $\lambda 2$, and $\lambda 3$ have essentially equal intensities. The reference composite light beam is guided by the input optical fiber 1, and then exists from the input optical fiber 1 via an outlet 1A thereof. Then, the reference composite light beam travels to a lens 3 (see FIG. 1) while spreading or diverging. The reference composite light beam is made by the lens 3 into a parallel composite light beam which reaches a diffraction grating 4 (see FIG. 1). The parallel composite light beam is separated by the diffraction grating 4 into the component light beams of the different wavelengths which travel along different directions from the diffraction grating 4 respectively. The directions of the travel of the component light beams from the diffraction grating 4 depend on the angular position of the diffraction grating 4 and the wavelengths of the component light beams. Subsequently, the component light beams basically enter the lens 3, and are focused by the lens 3 into spots at different positions which depend on the angular position of the diffraction grating 4 and the wavelengths thereof.

During the preliminary mode of operation, a drive controller 8 (see FIG. 1) controls a rotating mechanism 5 (see FIG. 1) so that the diffraction grating 4 will continue to be gradually rotated in a given angular range by the rotating mechanism 5. The angular position of the diffraction grating 4 determines whether or not the position of the spot of each component light beam coincides with the position of an inlet 2A of an output optical fiber 2 (see FIG. 1), that is, whether or not each component light beam enters the output optical fiber 2. When each component light beam enters the output optical fiber 2, the component light beam is guided by the output optical fiber 2 to a photodetector 6 (see FIG. 1). In this way, the component light beam which enters the output optical fiber 2 is received by the photodetector 6. The photodetector 6 converts the received component light beam into an electric signal having a voltage representing the intensity of the received component light beam. The photodetector 6 outputs the voltage signal to a peak detector 7 (see FIG. 1).

The intensity of the component light beam received by the photodetector 6 varies in accordance with the degree of the coincidence between the position of the spot of the component light beam and the position of the inlet 2A of the output optical fiber 2. The degree of the coincidence between the position of the spot of the component light beam and the position of the inlet 2A of the output optical fiber 2 depends on the angular position of the diffraction grating 4 and the wavelength of the component light beam. Accordingly, the intensity of the component light beam received by the photodetector 6 varies as a function of the angular position of the diffraction grating 4.

Figure 8:
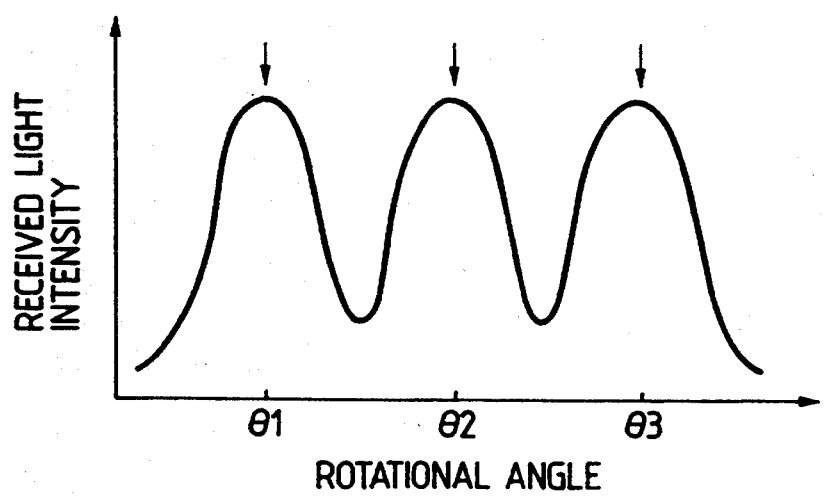
FIG. 8 is a diagram of the relation between the rotational angle of a diffraction grating and the intensity of a received light beam in a light wavelength selection device according to a third embodiment of this invention.

As previously described, there are three component light beams of different wavelengths $\lambda 1$, $\lambda 2$, and $\lambda 3$ respectively. Accordingly, as shown in FIG. 8, the intensity of the light beam received by the photodetector 6 peaks at three different given angular positions $\theta 1$, $\theta 2$, and $\theta 3$ of the diffraction grating 4 which correspond to the different wavelengths $\lambda 1$, $\lambda 2$, and $\lambda 3$ respectively.

Thus, during the preliminary mode of operation in which the diffraction grating 4 continues to be rotated, the voltage of the output signal from the photodetector 6 peaks when the angular position "$\theta$" of the diffraction grating 4 reaches each of the given angular positions $\theta 1$, $\theta 2$, and $\theta 3$. Each peak of the output signal from the photodetector 6 is detected by the peak detector 7. The peak detector 7 informs the drive controller 8 of the detection of each peak of the output signal from the photodetector 6. The drive controller 8 outputs a signal representative of the current angular position of the diffraction grating 4 (that is, the given angular position $\theta 1$, $\theta 2$, or $\theta 3$ of the diffraction grating 4) to a memory device 9 (see FIG. 1) in response to the information from the peak detector 7. At the same time, the peak detector 7 outputs a write enabling signal to the memory device 9 so that the angular position signal outputted from the drive controller 8 is stored into the memory device 9. In this way, the angular position signals which represent the given angular positions $\theta 1$, $\theta 2$, and $\theta 3$ of the diffraction grating 4 are stored into the memory device 9.

A normal mode of operation is executed after the preliminary mode of operation. During the normal mode of operation, the drive controller 8 receives an externally-applied tuning control signal representing a desired wavelength $\lambda d$ to be selected. The desired wavelength $\lambda d$ is set equal to one of the wavelengths λ1, λ2, and λ3. The drive controller 8 detects which of the wavelengths λ1, λ2, and λ3 is represented by the tuning control signal as a desired wavelength λd. When the desired wavelength λd is equal to the wavelength λ1, the drive controller 8 reads out the angular position signal from the memory device 9 which represents the given angular position θ1. When the desired wavelength λd is equal to the wavelength λ2, the drive controller 8 reads out the angular position signal from the memory device 9 which represents the given angular position θ2. When the desired wavelength λd is equal to the wavelength λ3, the drive controller 8 reads out the angular position signal from the memory device 9 which represents the given angular position θ3. The given angular position θ1, θ2, or θ3 represented by the readout angular position signal is a desired angular position θd of the diffraction grating 4. The drive controller 8 controls the rotating mechanism 5 in response to the desired angular position θd so that the diffraction grating 4 will assume an angular position which agrees with the desired angular position θd. In this way, the diffraction grating 4 is set to the desired angular position θd at which the desired wavelength λd is selected. The desired angular position θd agrees with the given angular positions θ1, θ2, and θ3 when the desired wavelength λd is equal to the wavelengths λ1, λ2, and λ3 respectively. Then, the diffraction grating 4 continues to be fixed at the desired angular position θd.

During the normal mode of operation, the input optical fiber 1 guides a wavelength division multiplexed (WDM) light beam or a composite light beam which has a plurality of component light beams of different wavelengths respectively. The desired wavelength λd represented by the tuning control signal is set equal to designated one of the wavelengths of the component light beams. The WDM light beam exits from the input optical fiber 1 via the outlet 1A thereof, and then travels to the lens 3 while spreading or diverging. The WDM light beam is made by the lens 3 into a parallel light beam which reaches the diffraction grating 4. The parallel WDM light beam is separated by the diffraction grating 4 into the component light beams of the different wavelengths which travel along different directions from the diffraction grating 4 respectively. The directions of the travel of the component light beams from the diffraction grating 4 depend on the wavelengths thereof.

Subsequently, the component light beams basically enter the lens 3, and are focused by the lens 3 into spots at different positions which depend on the wavelengths thereof. Only one of the component light beams which has a wavelength equal to the desired wavelength λd forms a spot positionally coincident with the inlet 2A of the output optical fiber 2. Accordingly, only the component light beam of the desired wavelength λd enters the output optical fiber 2 via the inlet 2A thereof. In this way, the component light beam of the desired wavelength λd is selected. The selected light beam is guided to the photodetector 6 via the output optical fiber 2 before being detected by the photodetector 6.

DESCRIPTION OF THE FOURTH PREFERRED EMBODIMENT

A fourth embodiment of this invention is similar to the embodiment of FIGS. 3–6 except for design changes indicated hereinafter.

During a preliminary mode of operation, a reference WDM (wavelength division multiplexed) light beam is introduced into an input optical fiber 1 (see FIG. 3). The reference WDM light beam is a reference composite light beam which has a plurality of component light beams of predetermined different wavelengths λ1, λ2, and λ3 respectively. As shown in FIG. 7, the component light beams of the different wavelengths λ1, λ2, and λ3 have essentially equal intensities. The reference composite light beam is guided by the input optical fiber 1, and then exists from the input optical fiber 1 via an outlet 1A thereof. Then, the reference composite light beam travels to a lens 3 (see FIG. 3) while spreading or diverging. The reference composite light beam is made by the lens 3 into a parallel composite light beam which reaches a diffraction grating 4 (see FIG. 3). The parallel composite light beam is separated by the diffraction grating 4 into the component light beams of the different wavelengths which travel along different directions from the diffraction grating 4 respectively. The directions of the travel of the component light beams from the diffraction grating 4 depend on the angular position of the diffraction grating 4 and the wavelengths thereof. Subsequently, the component light beams basically enter the lens 3, and are focused by the lens 3 into spots at different positions which depend on the angular position of the diffraction grating 4 and the wavelengths thereof.

During the preliminary mode of operation, a drive controller 8 (see FIG. 3) controls a rotating mechanism 5 (see FIG. 3) so that the diffraction grating 4 will continue to be gradually rotated in a given angular rage by the rotating mechanism 5. The angular position of the diffraction grating 4 determines whether or not the position of the spot of each component light beam coincides with the position of an inlet 2A of an output optical fiber 2 (see FIG. 3), that is, whether or not each component light beam enters the output optical fiber 2. When each component light beam enters the output optical fiber 2, the component light beam is guided by the output optical fiber 2 to a photodetector 6 (see FIG. 3). In this way, the component light beam which enters the output optical fiber 2 is received by the photodetector 6. The photodetector 6 converts the received component light beam into an electric signal having a voltage representing the intensity of the received component light beam. The photodetector 6 outputs the voltage signal to a microcomputer 20 (see FIG. 3).

The intensity of the component light beam received by the photodetector 6 varies in accordance with the degree of the coincidence between the position of the spot of the component light beam and the position of the inlet 2A of the output optical fiber 2. The degree of the coincidence between the position of the spot of the component light beam and the position of the inlet 2A of the output optical fiber 2 depends on the angular position of the diffraction grating 4 and the wavelength of the component light beam. Accordingly, the intensity of the component light beam received by the photodetector 6 varies as a function of the angular position of the diffraction grating 4.

As previously described, there are three component light beams of different wavelengths λ1, λ2, and λ3 respectively. Accordingly, as shown in FIG. 8, the intensity of the light beam received by the photodetector 6 peaks at three different given angular positions θ1, θ2, and θ3 of the diffraction grating 4 which correspond to the different wavelengths λ1, λ2, and λ3 respectively.

Thus, during the preliminary mode of operation in which the diffraction grating 4 continues to be rotated, the voltage of the output signal from the photodetector 6 peaks when the angular position "$\theta$" of the diffraction grating 4 reaches each of the given angular positions $\theta 1$, $\theta 2$, and $\theta 3$. The microcomputer 20 detects each peak of the output signal from the photodetector 6, and stores data representative of the given angular positions $\theta 1$, $\theta 2$, and $\theta 3$ into a RAM 20C (see FIG. 3). As previously described, the given angular positions $\theta 1$, $\theta 2$, and $\theta 3$ of the diffraction grating 4 correspond to the different wavelengths $\lambda 1$, $\lambda 2$, and $\lambda 3$ respectively.

A normal mode of operation is executed after the preliminary mode of operation. During the normal mode of operation, the microcomputer 20 receives an externally-applied tuning control signal representing a desired wavelength $\lambda d$ to be selected. The desired wavelength $\lambda d$ is set equal to one of the wavelengths $\lambda 1$, $\lambda 2$, and $\lambda 3$. The microcomputer 20 detects which of the wavelengths $\lambda 1$, $\lambda 2$, and $\lambda 3$ is represented by the tuning control signal as a desired wavelength $\lambda d$. When the desired wavelength $\lambda d$ is equal to the wavelength $\lambda 1$, the microcomputer 20 reads out the angular position signal from the RAM 20C which represents the given angular position $\theta 1$. When the desired wavelength $\lambda d$ is equal to the wavelength $\lambda 2$. the microcomputer 20 reads out the angular position signal from the RAM 20C which represents the given angular position $\theta 2$. When the desired wavelength $\lambda d$ is equal to the wavelength $\lambda 3$, the microcomputer 20 reads out the angular position signal from the RAM 20C which represents the given angular position $\theta 3$. The given angular position $\theta 1$, $\theta 2$, or $\theta 3$ represented by the readout angular position signal is a desired angular position $\theta d$ of the diffraction grating 4. The microcomputer 20 controls the rotating mechanism 5 in response to the desired angular position $\theta d$ so that the diffraction grating 4 will assume an angular position which agrees with the desired angular position $\theta d$. In this way, the diffraction grating 4 is set to the desired angular position $\theta d$ at which the desired wavelength $\lambda d$ is selected. The desired angular position $\theta d$ agrees with the given angular positions $\theta 1$, $\theta 2$, and $\theta 3$ when the desired wavelength $\lambda d$ is equal to the wavelengths $\lambda 1$, $\lambda 2$, and $\lambda 3$ respectively. Then, the diffraction grating 4 continues to be fixed at the desired angular position $\theta d$.

During the normal mode of operation, the input optical fiber 1 guides a wavelength division multiplexed (WDM) light beam or a composite light beam which has a plurality of component light beams of different wavelengths respectively. The desired wavelength $\lambda d$ represented by the tuning control signal is set equal to designated one of the wavelengths of the component light beams. The WDM light beam exits from the input optical fiber 1 via the outlet 1A thereof, and then travels to the lens 3 while spreading or diverging. The WDM light beam is made by the lens 3 into a parallel light beam which reaches the diffraction grating 4. The parallel WDM light beam is separated by the diffraction grating 4 into the component light beams of the different wavelengths which travel along different directions from the diffraction grating 4 respectively. The directions of the travel of the component light beams from the diffraction grating 4 depend on the wavelengths thereof.

Subsequently, the component light beams basically enter the lens 3, and are focused by the lens 3 into spots at different positions which depend on the wavelengths thereof. Only one of the component light beams which has a wavelength equal to the desired wavelength $\lambda d$ forms a spot positionally coincident with the inlet 2A of the output optical fiber 2. Accordingly, only the component light beam of the desired wavelength $\lambda d$ enters the output optical fiber 2 via the inlet 2A thereof. In this way, the component light beam of the desired wavelength $\lambda d$ is selected. The selected light beam is guided to the photodetector 6 via the output optical fiber 2 before being detected by the photodetector 6.

Figure 9:
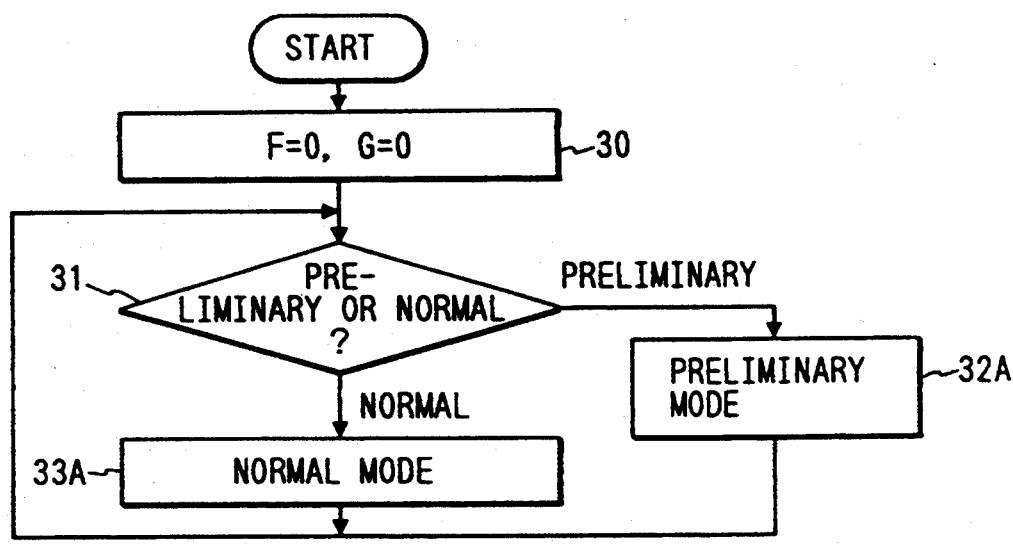
FIG. 9 is a flowchart of a program for controlling a microcomputer in a light wavelength selection device according to a fourth embodiment of this invention.

The microcomputer 20 operates in accordance with a program stored in a ROM 20B (see FIG. 3). FIG. 9 is a flowchart of this program. As shown in FIG. 9, a first step 30 of the program sets flags F and G to "0". After the step 30, the program advances to a step 31. The step 31 checks the state of a mode control signal and determines whether the mode control signal requires the preliminary mode of operation or the normal mode of operation. When the mode control signal is determined to require the preliminary mode of operation, the program advances from the step 31 to a preliminary mode block 32A. When the mode control signal is determined to require the normal mode of operation, the program advances from the step 31 to a normal mode block 33A. After the blocks 32A and 33A, the program returns to the step 31.

Figure 10:
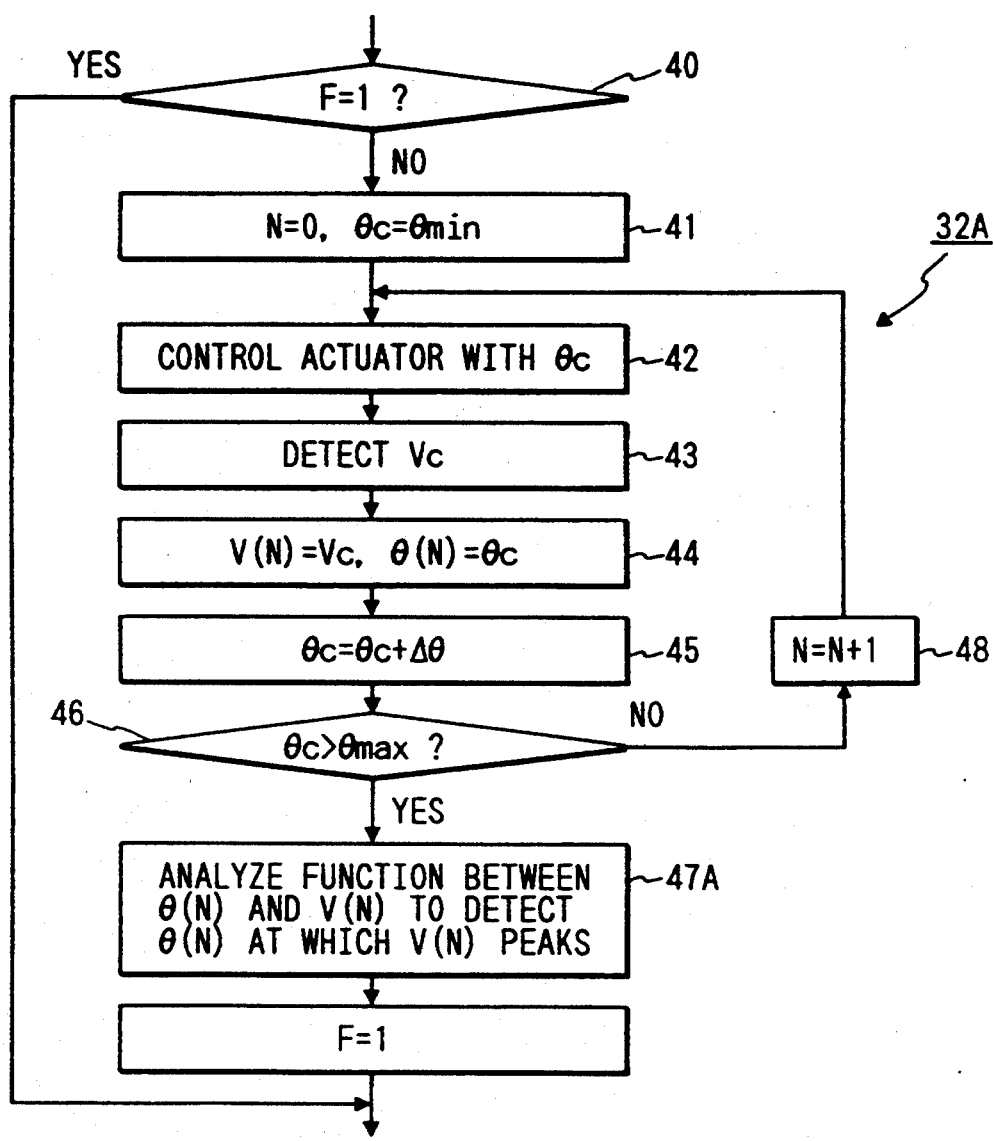
FIG. 10 is a diagram of the details of a preliminary mode block in FIG. 9.

FIG. 10 shows the details of the preliminary mode block 32A. As shown in FIG. 5, a first step 40 in the preliminary mode block 32 which immediately follows the step 31 of FIG. 9 determines whether or not the flag F is "1". When the flag F is determined to be "1", the program advances from the step 40 and then exits from the preliminary mode block 32A before returning to the step 31 of FIG. 9. Otherwise, the program advances from the step 40 to a step 41.

The preliminary mode block 32A includes steps 41, 42, 43, 44, 45, 46, and 48 which are similar to the steps 41, 42, 43, 45, 46, and 48 of FIG. 5. In FIG. 10, when the step 46 decides a current angular position value $\theta c$ to be greater than a predetermined value $\theta max$, the program advances from the step 46 to a step 47A.

The step 47A analyzes the relation or function between values $\theta(N)$ and $V(N)$, and detects each value $\theta(N)$ at which the value $V(N)$ peaks. Specifically, the step 47A differentiates the value $V(N)$ with respect to the value $\theta(N)$ to derive peaks of the value $V(N)$, and then determines each value $\theta(N)$ at which the value $V(N)$ peaks. The step 47A sets values $\theta 1$, $\theta 2$, ... $\theta K$ equal to the respective values $\theta(N)$ at which the value $V(N)$ peaks where K denotes a natural number (equal to 3 in this embodiment). The values $\theta 1$, $\theta 2$, and $\theta 3$ indicate given angular positions of the diffraction grating 4 which correspond to the different wavelengths $\lambda 1$, $\lambda 2$, and $\lambda 3$ respectively. The step 47A stores data of the given angular positions $\theta 1$, $\theta 2$, and $\theta 3$ into a RAM 20C (see FIG. 3). The step 47A is followed by a step 50 which sets the flag F to "1". After the step 50, the program exits from the preliminary mode block 32A and then returns to the step 31 of FIG. 9.

Figure 11:
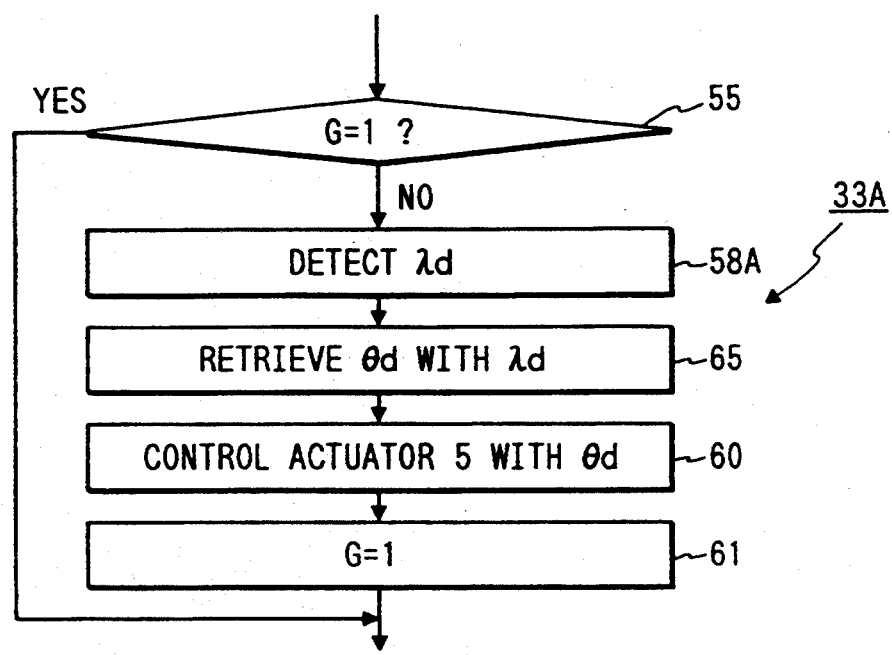
FIG. 11 is a diagram of tile details of a normal mode block in FIG. 9.

FIG. 11 shows the details of the normal mode block 33A. As shown in FIG. 11, a first step 55 in the normal mode block 33A which immediately follows the step 31 of FIG. 9 determines whether or not the flag G is "1". When the flag G is determined to be "1", the program advances from the step 55 and then exits from the normal mode block 33A before returning to the step 31 of FIG. 9. Otherwise, the program advances from the step 55 to a step 58A.

The step 58A detects the desired wavelength $\lambda d$ represented by the tuning control signal. A step 65 detects which of the wavelengths λ1, λ2, and λ3 is represented by the tuning control signal as a desired wavelength λd. When the desired wavelength λd is equal to the wavelength λ1, the step 65 retrieves the angular position signal from the RAM 20C which represents the given angular position θ1. When the desired wavelength λd is equal to the wavelength λ2, the step 65 retrieves the angular position signal from the RAM 20C which represents the given angular position θ2. When the desired wavelength λd is equal to the wavelength λ3, the step 65 retrieves the angular position signal from the RAM 20C which represents the given angular position θ3. The given angular position θ1, θ2, or θ3 represented by the retrieved angular position signal is set as a desired angular position θd of the diffraction grating 4.

A step 60 following the step 65 controls the rotating mechanism (actuator) 5 in response to the desired angular position θd so that the diffraction grating 4 will be moved to an angular position corresponding to the desired angular position value θd. As in the embodiment of FIG. 1, only the component light beam of the desired wavelength λd is selected when the diffraction grating 4 is set to the desired angular position θd. A step 61 following the step 60 sets the flag G to "1". After the step 61, the program exits from the normal mode block 33A and then returns to the step 31 of FIG. 9.

DESCRIPTION OF THE FIFTH PREFERRED EMBODIMENT

Figure 12:
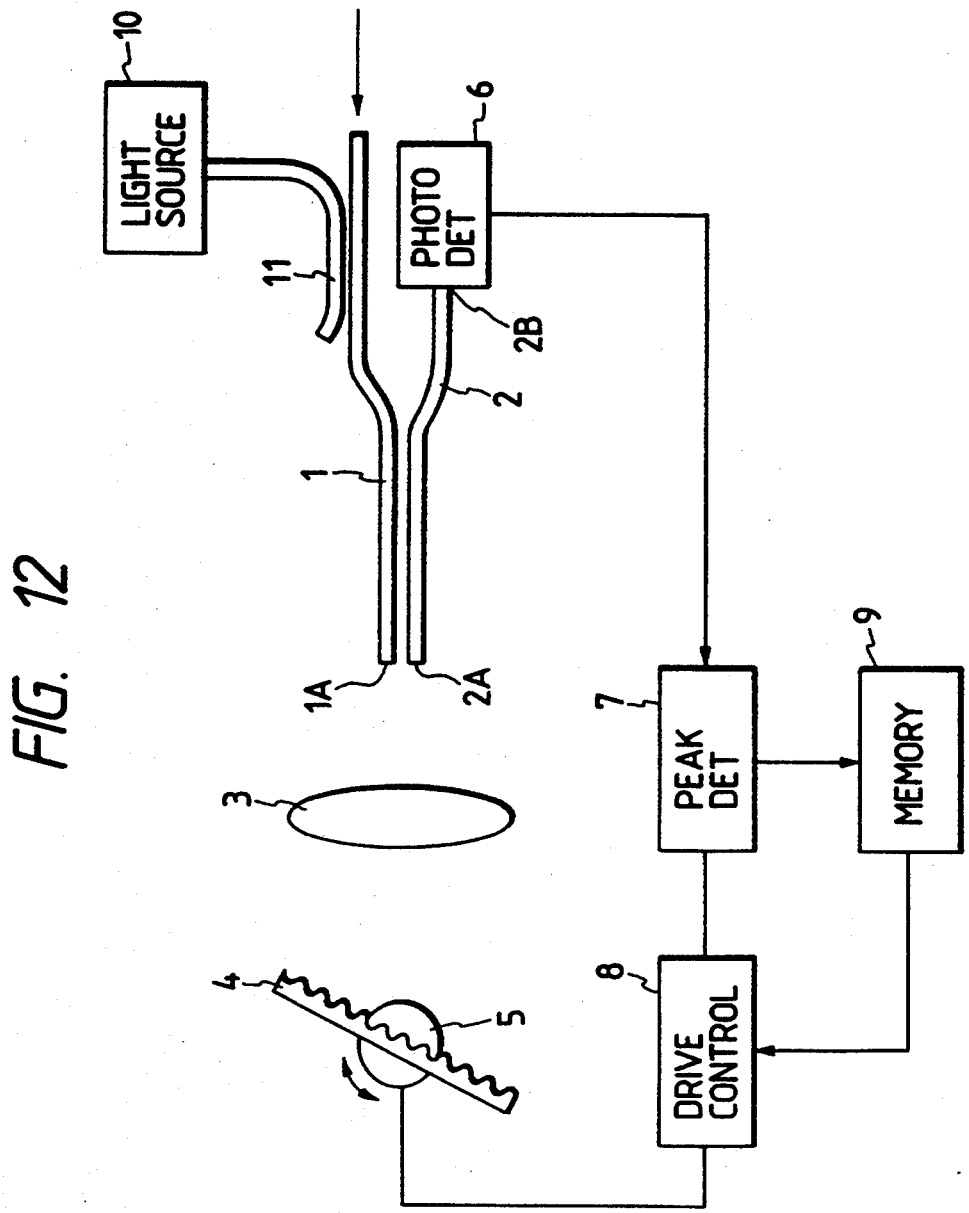
FIG. 12 is a diagram of a light wavelength selection device according to a fifth embodiment of this invention.

FIG. 12 shows a fifth embodiment of this invention which is similar to the embodiment of FIG. 1 except for design changes indicated hereinafter.

The embodiment of FIG. 12 includes a directional coupler 11 optically connected to an input optical fiber 1. In addition, the directional coupler 11 is optically connected to a light source 10 including a laser capable of emitting a light beam in a single mode. The directional coupler 11 serves as an optical multiplexer. The light beam emitted from the laser 10 has a predetermined wavelength equal to a reference wavelength λ0.

During a preliminary mode of operation, the light source 10 is activated so that the light source 10 emits the light beam of the reference wavelength λ0. The light beam emitted from the light source 10 is guided to the directional coupler 11, and is introduced via the directional coupler 11 into the input optical fiber 1 as a reference light beam of the reference wavelength λ0.

DESCRIPTION OF THE SIXTH PREFERRED EMBODIMENT

Figure 13:
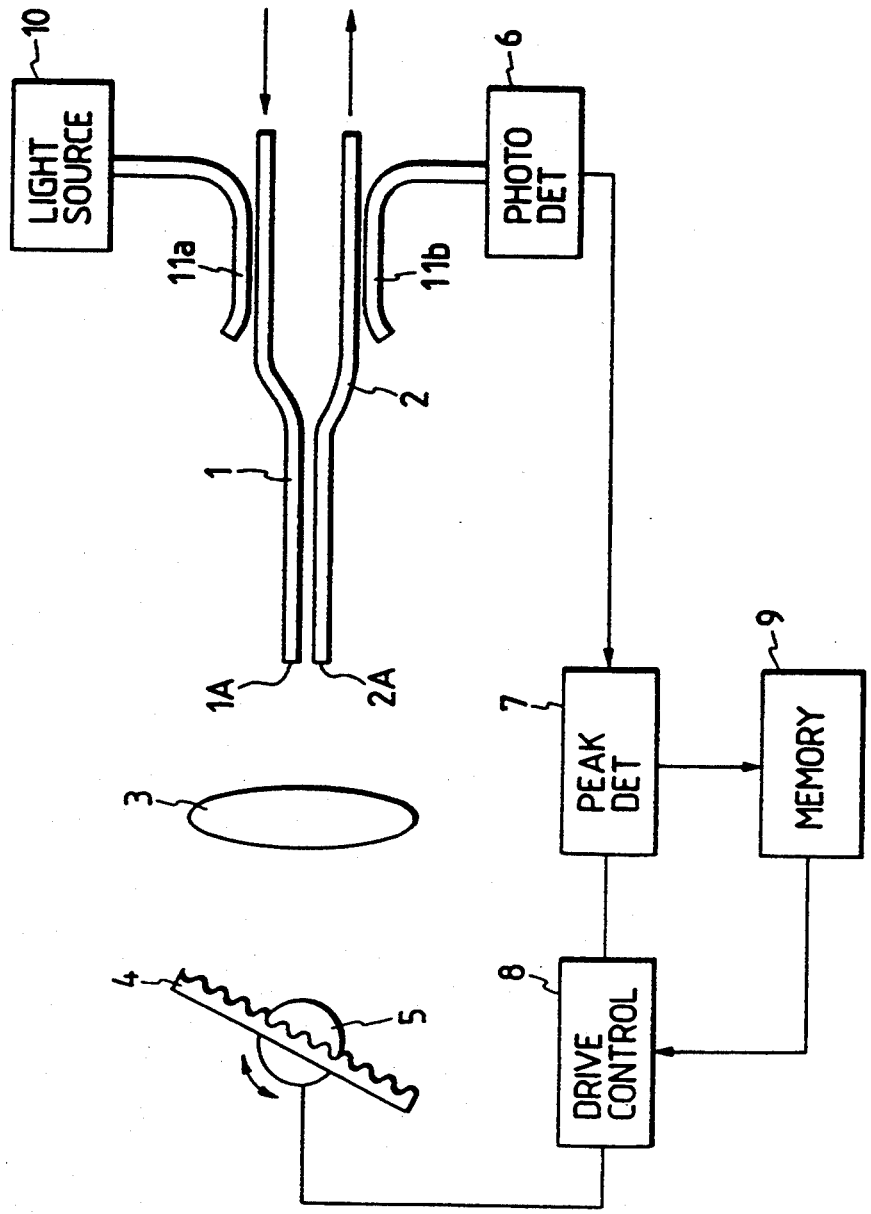
FIG. 13 is a diagram of a light wavelength selection device according to a sixth embodiment of this invention.

FIG. 13 shows a sixth embodiment of this invention which is similar to the embodiment of FIG. 1 except for design changes indicated hereinafter.

The embodiment of FIG. 13 includes a directional coupler 11a optically connected to an input optical fiber 1. In addition, the directional coupler 11a is optically connected to a light source 10 including a laser capable of emitting a light beam in a single mode. The directional coupler 11a serves as an optical multiplexer. The light beam emitted from the laser 10 has a predetermined wavelength equal to a reference wavelength λ0.

During a preliminary mode of operation, the light source 10 is activated so that the light source 10 emits the light beam of the reference wavelength λ0. The light beam emitted from the light source 10 is guided to the directional coupler 11a, and is introduced via the directional coupler 11a into the input optical fiber 1 as a reference light beam of the reference wavelength λ0

The embodiment of FIG. 13 also includes a directional coupler 11b optically connected to an output optical fiber 2. In addition, the directional coupler 11b is optically connected to a photodetector 6. The directional coupler 11b serves as an optical demultiplexer. During the preliminary mode of operation, a light beam which enters the output optical fiber 2 via its inlet 2A is guided via the directional coupler 11b to the photodetector 6 and is thus detected by the photodetector 6.

During a normal mode of operation, a light beam which enters the output optical fiber 2 can be transmitted to an external optical device (not shown) connected to an outlet of the output optical fiber 2.

DESCRIPTION OF THE SEVENTH PREFERRED EMBODIMENT

Figure 14:
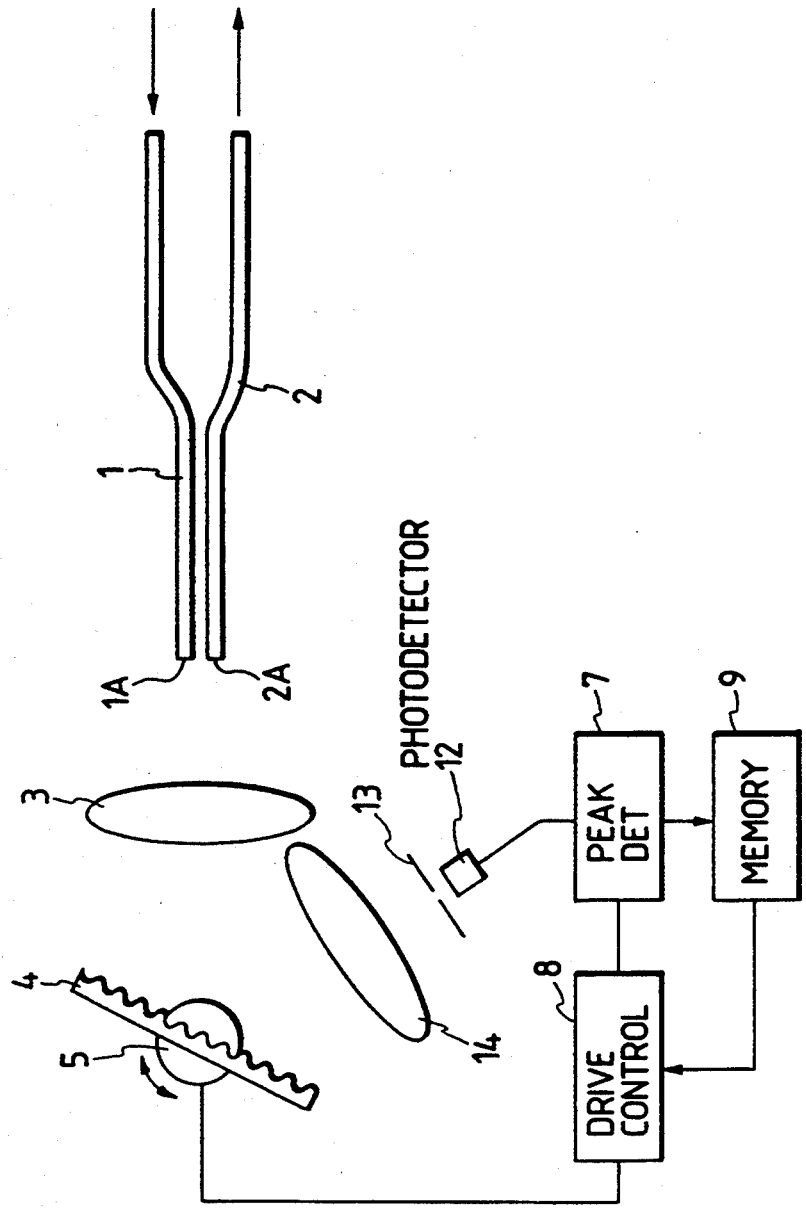
FIG. 14 is a diagram of a light wavelength selection device according to a seventh embodiment of this invention.

FIG. 14 shows a seventh embodiment of this invention which is similar to the embodiment of FIG. 1 except for design changes indicated hereinafter.

The embodiment of FIG. 14 includes a photodetector 12, a slit member 13, and a lens 14. The lens 14 is positioned to receive light reflected at a diffraction grating 4. The lens 14 is angularly separated from a lens 3 so as not to prevent the lens 3 from receiving diffracted light beams from the diffraction grating 4. The lens 14 is successively followed by the slit member 13 and the photodetector 12 along a direction of the travel of light from the diffraction grating 4. The photodetector 12 is electrically connected to a peak detector 7.

In the embodiment of FIG. 14, an outlet of an output optical fiber 2 is connected to an external optical device (not shown).

During a preliminary mode of operation, a portion of a reference light beam incident to the diffraction grating 4 from the lens 3 is directly reflected at the diffraction grating 4 without being diffracted since the diffraction efficiency of the diffraction grating 4 is smaller than 100%. A portion of the reflected light beam enters the lens 14 from the diffraction grating 4, being focused into a spot in a slit in the member 13 and being then detected by the photodetector 12. The intensity of the light beam detected by the photodetector 12 varies as the diffraction grating 4 is rotated. Specifically, the intensity of the light beam detected by the photodetector 12 peaks at a given angular position of the diffraction grating 4. The peak and the related given angular position of the diffraction grating 4 are detected by a combination of the peak detector 7 and a drive controller 8. A signal representing the given angular position of the diffraction grating 4 is stored into a memory device 9.

The detected given angular position of the diffraction grating 4 is independent of the wavelength of the reference light beam. Accordingly, a light beam of any wavelength can be used as the reference light beam.

During a normal mode of operation, the signal representing the given angular position of the diffraction grating 4 is retrieved from the memory device 9, and is used as an indication of a reference angular position in controlling and determining the actual angular position of the diffraction grating 4. The use of the reference angular position makes adjustment of the absolute angular position of the diffraction grating 4 unnecessary. In addition, during the normal mode of operation, a selected light beam is guided by the output optical fiber 2 before reaching the external optical device connected to the outlet of the output optical fiber 2.

DESCRIPTION OF THE OTHER PREFERRED EMBODIMENTS

The first to seventh embodiments may be modified as follows. In a first modification of the embodiments, a diffraction grating 4 is linearly reciprocated instead of being rotated. In a second modification of the embodiments, an input optical fiber 1, an output optical fiber 2, and a lens 3 are rotated or moved while a diffraction grating 4 remains fixed. In a third modification of the embodiments, the number of component light beams differs from three.

What is claimed is:

1. A method comprising the steps of:
    applying a reference light beam of a given wavelength to a diffraction element during a preliminary mode of operation, wherein the reference light beam is diffracted by the diffraction element and is thereby changed into a diffracted reference light beam traveling from the diffraction element;
    rotating the diffraction element relative to a direction of travel of the reference light beam while the reference light beam remains applied to the diffraction element during the preliminary mode of operation;
    detecting an intensity of a portion of the diffracted reference light beam in a given positional region fixed with respect to the direction of travel of the reference light beam;
    detecting a position of the diffraction element at which the detected intensity peaks while the diffraction element remains rotated during the preliminary mode of operation;
    setting the detected position of the diffraction element at which the detected intensity peaks as a reference position during the preliminary mode of operation;
    during a normal mode of operation which follows the preliminary mode of operation, applying a wavelength division multiplexed input light beam to the diffraction element along a direction equal to the direction of travel of the reference light beam, wherein the input light beam is diffracted by the diffraction element and is thereby changed into a diffracted input light beam traveling from the diffraction element;
    determining a desired position of the diffraction element in response to the reference position;
    holding a current position of the diffraction element at the desired position during the normal mode of operation; and
    selecting a portion of the diffracted input light beam which travels in the given positional region during the normal mode of operation.

2. An apparatus comprising:
    a rotatable diffraction element;
    means for applying a reference light beam of a given wavelength to the diffraction element during a preliminary mode of operation, wherein the reference light beam is diffracted by the diffraction element and is thereby changed into a diffracted reference light beam traveling from the diffraction element;
    means for rotating the diffraction element relative to a direction of travel of the reference light beam while the reference light beam remains applied to the diffraction element during the preliminary mode of operation;
    means for detecting an intensity of a portion of the diffracted reference light beam in a given positional region fixed with respect to the direction of travel of the reference light beam;
    means for detecting a position of the diffraction element at which the detected intensity peaks while the diffraction element remains rotated during the preliminary mode of operation;
    means for setting the detected position of the diffraction element at which the detected intensity peaks as a reference position during the preliminary mode of operation;
    means for, during a normal mode of operation which follows the preliminary mode of operation, applying a wavelength division multiplexed input light beam to the diffraction element along a direction equal to the direction of travel of the reference light beam, wherein the input light beam is diffracted by the diffraction element and is thereby changed into a diffracted input light beam traveling from the diffraction element;
    means for determining a desired position of the diffraction element in response to the reference position;
    means for holding a current position of the diffraction element at the desired position during the normal mode of operation; and
    means for selecting a portion of the diffracted input light beam which travels in the given positional region during the normal mode of operation.

3. A method of using a light wavelength selection device, comprising the steps of:
    applying an input light beam to diffracting means during a preliminary mode of operation;
    moving the diffracting means relative to a path of the input light beam while the input light beam is diffracted by the diffracting means and is thereby made into a diffracted light beam traveling from the diffracting means during the preliminary mode of operation;
    receiving a portion of the diffracted light beam and detecting an intensity of the received diffracted light beam during the preliminary mode of operation;
    detecting a peak of the detected intensity of the received diffracted light beam while the diffracting means is moved relative to the path of the input light beam during the preliminary mode of operation;
    detecting a reference position of the diffracting means at which the detected peak of the detected intensity occurs during the preliminary mode of operation;
    moving the diffracting means to the detected reference position during a normal mode of operation which follows the preliminary mode of operation; and
    holding the diffracting means at the reference position during the normal mode of operation.

4. The method of claim 3, further comprising the steps of activating a light source to emit the input light beam, introducing the input light beam from the light source into an input optical fiber via an optical multiplexer, and transmitting the input light beam from the input optical fiber toward the diffracting means.

5. The method of claim 3, wherein the step of receiving the portion of the diffracted light beam and detecting the intensity of the received diffracted light beam comprises transmitting the portion of the diffracted light beam to a photodetector via one of an optical demultiplexer and an optical directional coupler.

6. The method of claim 3, wherein the input light beam comprises a wavelength division multiplexed light beam having a plurality of component light beams of different wavelengths respectively, and a plurality of peaks of the detected intensity of the received diffracted light beam are detected in correspondence with the component light beams respectively during the preliminary mode of operation, wherein a plurality of reference positions of the diffracting means at which the detected peaks of the detected intensity occur are detected in correspondence with the component light beams respectively during the preliminary mode of operation, wherein the diffracting means is moved to and is then held at first one of the reference positions during a first stage of the normal mode of operation, and wherein the diffracting means is moved from the first one of the reference positions to second one of the reference positions and is then held at the second one of the reference position during a second stage of the normal mode of operation which follows the first stage.

7. The method of claim 6, further comprising the steps of setting one of the reference positions of the diffracting means as a prescribed position, determining a difference between the prescribed position and each of others of the reference positions, and moving the diffracting means to each of the others of the reference positions in response to the determined difference.

8. A method of using a light wavelength selection device, comprising the steps of:
radiating an input light beam from a radiation position and applying the radiated input light beam to diffracting means during a preliminary mode of operation;
moving the radiation position relative to the diffracting means while the input light beam is diffracted by the diffracting means and is thereby made into a diffracted light beam traveling from the diffracting means during the preliminary mode of operation;
receiving a portion of the diffracted light beam and detecting an intensity of the received diffracted light beam during the preliminary mode of operation;
detecting a peak of the detected intensity of the received diffracted light beam while the radiation position is moved during the preliminary mode of operation;
detecting the radiation position at which the detected peak of the detected intensity occurs, and setting the detected radiation position as a reference radiation position during the preliminary mode of operation;
moving the radiation position to the reference position during a normal mode of operation which follows the preliminary mode of operation; and
holding the radiation position at the reference position during the normal mode of operation.

9. The method of claim 8, further comprising the steps of activating a light source to emit the input light beam, introducing the input light beam from the light source into an input optical fiber via an optical multiplexer, and transmitting the input light beam from the input optical fiber toward the diffracting means.

10. The method of claim 8, wherein the step of receiving the portion of the diffracted light beam and detecting the intensity of the received diffracted light beam comprises transmitting the portion of the diffracted light beam to a photodetector via one of an optical demultiplexer and an optical directional coupler.

11. The method of claim 8, wherein the input light beam comprises a wavelength division multiplexed light beam having a plurality of component light beams of different wavelengths respectively, and a plurality of peaks of the detected intensity of the received diffracted light beam are detected in correspondence with the component light beams respectively during the preliminary mode of operation, wherein a plurality of reference positions of the radiation position at which the detected peaks of the detected intensity occur are detected in correspondence with the component light beams respectively during the preliminary mode of operation, wherein the radiation position is moved to and is then held at first one of the reference positions during a first stage of the normal mode of operation, and wherein the radiation position is moved from the first one of the reference positions to second one of the reference positions and is then held at the second one of the reference position during a second stage of the normal mode of operation which follows the first stage.

12. The method of claim 11, further comprising the steps of setting one of the reference positions of the radiation position as a prescribed position, determining a difference between the prescribed position and each of others of the reference positions, and moving the radiation position to each of the others of the reference positions in response to the determined difference.

13. A method of using a light wavelength selection device, comprising the steps of:
applying an input light beam to diffracting means during a preliminary mode of operation;
receiving a portion of the diffracted light beam at a reception position and detecting an intensity of the received diffracted light beam during the preliminary mode of operation;
detecting a peak of the detected intensity of the received diffracted light beam while moving the reception position during the preliminary mode of operation;
detecting the reception position at which the detected peak of the detected intensity occurs, and setting the detected reception position as a reference position;
moving the reception position to the reference position during a normal mode of operation which follows the preliminary mode of operation; and
holding the reception position at the reference position during the normal mode of operation.

14. The method of claim 13, further comprising the steps of activating a light source to emit the input light beam, introducing the input light beam from the light source into an input optical fiber via an optical multiplexer, and transmitting the input light beam from the input optical fiber toward the diffracting means.

15. The method of claim 13, wherein the step of receiving the portion of the diffracted light beam and detecting the intensity of the received diffracted light beam comprises transmitting the portion of the diffracted light beam to a photodetector via one of an optical demultiplexer and an optical directional coupler.

16. The method of claim 13, wherein the input light beam comprises a wavelength division multiplexed light beam having a plurality of component light beams of different wavelengths respectively, and a plurality of peaks of the detected intensity of the received diffracted light beam are detected in correspondence with the component light beams respectively during the preliminary mode of operation, wherein a plurality of reference positions of the reception position at which the detected peaks of the detected intensity occur are detected in correspondence with the component light beams respectively during the preliminary mode of operation, wherein the reception position is moved to and is then held at first one of the reference positions during a first stage of the normal mode of operation, and wherein the reception position is moved from the first one of the reference positions to second one of the reference positions and is then held at the second one of the reference position during a second stage of the normal mode of operation which follows the first stage.

17. The method of claim 16, further comprising the steps of setting one of the reference positions of the reception position as a prescribed position, determining a difference between the prescribed position and each of others of the reference positions, and moving the radiation position to each of the others of the reference positions in response to the determined difference.

18. A method of using a light wavelength selection device, comprising the steps of:
previously memorizing relative distances between a reference position and positions of diffracting means for detecting light beams of different wavelengths respectively during a preliminary mode of operation, the diffracting means having a reflecting portion;
applying an input light beam to the diffracting means, the input light beam including a wavelength division multiplexed light beam having a plurality of component light beams of different wavelengths respectively during the preliminary mode of operation;
moving the diffracting means relative to a path of the input light beam while the input light beam is reflected by the reflecting portion and is thereby made into a reflected light beam traveling from the diffracting means during the preliminary mode of operation;
receiving the reflected light beam and detecting an intensity of the received reflected light beam during the preliminary mode of operation;
detecting a peak of the detected intensity of the received reflected light beam while the diffracting means is moved relative to the path of the input light beam during the preliminary mode of operation;
detecting a position of the diffracting means at which the detected peak of the detected intensity occurs during the preliminary mode of operation;
setting the detected position of the diffracting means at which the detected peak of the detected intensity occurs as the reference position during the preliminary mode of operation;
determining desired positions of the diffracting means relative to the reference position in accordance with light wavelengths to be selected respectively during a normal mode of operation which follows the preliminary mode of operation;
setting the diffracting means at first one of the desired positions, and holding the diffracting means at the first one of the desired positions during a first stage of the normal mode of operation; and
moving the diffracting means to second one of the desired positions, and holding the diffracting means at the second one of the desired positions during a second stage of the normal mode of operation which follows the first stage.

19. The method of claim 18, further comprising the step of using a diffraction grating as the diffracting means.

20. A light wavelength selection device comprising:
light inputting means for inputting an input light beam;
light diffracting means for diffracting the input light beam;
drive means for moving the diffracting means relative to a path of the input light beam;
light receiving means for receiving a portion of a diffracted light beam which has been diffracted by the diffracting means;
light intensity detecting means for detecting a peak of an intensity of the received diffracted light beam while the diffracting means is moved relative to the path of the input light beam by the drive means during a preliminary mode of operation;
position detecting means for detecting a reference position of the diffracting means at which the detected peak of the detected intensity occurs during the preliminary mode of operation;
memory means for storing the detected reference position of the diffracting means during the preliminary mode of operation;
means for moving the diffracting means to the detected reference position during a normal mode of operation which follows the preliminary mode of operation; and
holding the diffracting means at the reference position during the normal mode of operation.

21. The light wavelength selection device of claim 20, further comprising a light source for emitting the input light beam, an optical multiplexer for introducing the input light beam into the light inputting means.

22. The light wavelength selection device of claim 20, wherein the diffracting means comprises a diffraction grating.

23. A light wavelength selection device comprising:
light inputting means for inputting an input light beam;
drive means for moving the light inputting means;
light diffracting means for diffracting the input light beam;
light receiving means for receiving a portion of a diffracted light beam which has been diffracted by the diffracting means;
light intensity detecting means for detecting a peak of an intensity of the received diffracted light beam while the light inputting means is moved by the drive means during a preliminary mode of operation;
position detecting means for detecting a reference position of the light inputting means at which the detected peak of the detected intensity occurs during the preliminary mode of operation;
memory means for storing the detected reference position of the light inputting means at which the detected peak of the detected intensity occurs during the preliminary mode of operation;
means for moving the light inputting means to the stored reference position during a normal mode of operation which follows the preliminary mode of operation; and means for holding the light inputting means at the reference position during the normal mode of operation.

24. The light wavelength election device of claim 23, further comprising a light source for emitting the input light beam, an optical multiplexer for introducing the input light beam into the light inputting means.

25. A light wavelength selection device comprising:
light inputting means for inputting an input light beam;
light diffracting means for diffracting the input light beam;
light receiving means for receiving a portion of a diffracted light beam which has been diffracted by the diffracting means;
drive means for moving the light receiving means;
light intensity detecting means for detecting a peak of an intensity of the received diffracted light beam while the light receiving means is moved by the drive means during a preliminary mode of operation;
position detecting means for detecting a reference position of the light receiving means at which the detected peak of the detected intensity occurs during the preliminary mode of operation;
memory means for storing the detected reference position of the light receiving means at which the detected peak of the detected intensity occurs during the preliminary mode of operation;
means for moving the light receiving means to the stored reference position during a normal mode of operation which follows the preliminary mode of operation; and
means for holding the light receiving means at the reference position during the normal mode of operation.

26. The light wavelength selection device of claim 25, further comprising a light source for emitting the input light beam, an optical multiplexer for introducing the input light beam into the light inputting means.

27. A light wavelength selection device comprising:
memory means for previously storing relative distances between a reference position and positions for detecting light beams of different wavelengths respectively;
light inputting means for inputting an input light beam which includes a wavelength division multiplexed light beam having a plurality of component light beams of different wavelengths respectively;
light diffracting means for diffracting the input light beam, the light diffracting means having a reflecting portion;
drive means for moving the diffracting means relative to a path of the input light beam;
light receiving means for receiving a portion of a diffracted light beam which has been diffracted by the diffracting means;
light intensity detecting means for detecting a peak of an intensity of a reflected light beam which has been reflected by the reflecting portion of the diffracting means while the diffracting means is moved relative to the path of the input light beam by the drive means during a preliminary mode of operation;
position detecting means for detecting a position of the diffracting means at which the detected peak of the detected intensity occurs, and for setting the detected position of the diffracting means as the reference position during the preliminary mode of operation;
means for determining desired positions of the diffracting means relative to the reference position in accordance with light wavelengths to be selected respectively during a normal mode of operation which follows the preliminary mode of operation;
means for setting the diffracting means at first one of the desired positions, and holding the diffracting means at the first one of the desired positions during a first stage of the normal mode of operation; and
moving the diffracting means to second one of the desired positions, and holding the diffracting means at the second one of the desired positions during a second stage of the normal mode of operation which follows the first stage.

* * * * *